Patented Aug. 29, 1950

2,520,670

UNITED STATES PATENT OFFICE 2,520,670

POLYGLYCEROLS

Harold Wittcoff and John Robert Roach, Minneapolis, Minn., assignors to General Mills, Inc., a corporation of Delaware No Drawing. Application October 24, 1946, Serial No. 705,488

2 Claims. (Cl. 260—615)

The present invention relates to novel processes of producing polyglycerols.

Polyglycerols are higher functional polyalcohols and are found useful in many applications. Heretofore, they have been prepared in general, by high temperature polymerization of glycerol. The resulting product is a mixture of various polymers of glycerol contaminated with various reaction by-products such as acrolein. The reaction-mixture product has been used as such in various applications, but it has been desirable to devise means of preparing polyglycerols which are free from the disadvantages attendant the high temperature polymerization process.

The present invention involves a novel process of producing polyglycerols at temperatures lower than was heretofore necessary in glycerol polymerization processes, whereby a product free from the disadvantages of the previous product is obtained.

It is, therefore, an object of the invention to provide a novel process of producing polyglycerols.

The invention involves the reaction of glycerol with an etherifying agent selected from the group consisting of glycerol-monohalohydrin and glycidol. Either of these etherifying agents will react with the glycerol to form a di- or tri- or higher polyglycerol, depending upon the reaction conditions and the ratio of reactants. It is thus possible to control the reaction to get a predominance of any particular polymer, and at the same time, to produce a product having desirable physical characteristics. The etherification is simple and proceeds readily. Any conventional etherification procedure may be used. It has been found desirable, however, to employ as the condensing medium, a solution of a concentrated caustic alkali, such as 50% sodium hydroxide solution, although more dilute solutions may be used. The glycerol may be mixed with the requisite amount of the caustic alkali solution, usually a 0.1 molar excess, based on the amount of the etherifying agent. Thereafter the etherifying agent may be added all at once or slowly over a period of several hours with agitation and heating. Then the precipitated inorganic material is removed by filtration and the filtrate is neutralized and concentrated under reduced pressure. From the residue the desired product may be obtained by extracting with an alcoholic solvent such as methanol, ethanol, propanol, isopropanol, etc.

In the case where glycidol is used as the etherifying agent, the reaction proceeds much more readily than in the case of the glycerol monohalohydrin, and it is usually desirable to use only a catalytic amount of either caustic alkali or acid as the condensing agent.

A great amount of variation is possible insofar as time and temperature are concerned. Thus the reaction time may extend from one to twelve or more hours, whereas the temperature may vary from room temperature in the case of glycidol, to 150° C. or more in the case of a glycerol monohalohydrin. It has been found that good results may easily be obtained by employing the temperature of 50–100° C. for 4 to 8 hours.

The nature of the constituents of the mixtures has been determined by two methods. In the first, the polyglycerol mixture was subjected to allylation and the resulting allyl ethers distilled. There was obtained the allyl ethers of glycerol, diglycerol and triglycerol, together with some non-distillable residue. In the second case, the mixture was converted to a mixture of acetals such as the acetone derivatives and these were distilled, as described in a copending patent application of Wittcoff, #677,423, filed June 17, 1946, now Patent No. 2,477,550, entitled Separation of the Components of Polyglycerol Mixtures. Here there were obtained the acetone derivatives of glycerol, diglycerol, and a mixture of tri- and higher glycerols. These experiments serve to prove that there results in this process a substantial quantity of linear polyglycerols.

Example 1

Glycerol (95%, 192 parts) was mixed thoroughly with aqueous sodium hydroxide (50%, 352 parts) while being externally cooled. The mixture was thereupon heated to 90° C. after which glycerol - alpha - monochlorohydrin (444 parts) was added over a period of one and one-half hours. The reaction mixture was kept at 90° C. during the addition by external cooling and eventually by heating. After addition was completed the reaction mixture was heated and stirred at 90° C. for five hours. Thereupon it was diluted with 500 parts of methyl alcohol, filtered, neutralized with dilute hydrochloric acid and concentrated at reduced pressure. The resulting syrup was extracted several times with absolute methyl alcohol and the solvent was evaporated to obtain the syrup which possessed a hydroxyl content of 36.1%.

Example 2

A mixture of 288 parts of 95% glycerol and 264 parts of 50% aqueous sodium hydroxide was reacted with 333 parts of glycerol-alpha-monochlorohydrin, according to the procedure indicated in Example 1. In this case, the ratio of glycerol to glycerol-alpha-monochlorohydrin was 1:1, as opposed to the preceding example where the ratio was 1:2. The product was isolated as described previously to obtain a syrup whose hydroxyl content was 41.3%.

*Example 3*

A mixture of 368 parts of anhydrous glycerol and 88 parts of 50% aqueous sodium hydroxide was treated with 111 parts of glycerol-alpha-monochlorohydrin at 90–100° C. over a period of one and one-half hours. Thereafter, the reaction mixture was heated and stirred at 90–100° C. for two and one-half hours. The reaction mixture was then neutralized with dilute hydrochloric acid and worked up as described in Example 1. Thereafter, the reaction product was subjected to distillation at reduced pressures to obtain a distillate of 100 parts of glycerol. The undistilled portion possessed a hydroxyl content of 45.7%.

The following experiment demonstrates the type of products obtained by this process. To a mixture of 200 parts of a polyglycerol with a hydroxyl content of 30% and 750 parts of 50% aqueous sodium hydroxide was added at 70–80° C. with stirring 1,110 parts of allyl bromide over a period of 5 hours. The reaction mixture was thereafter stirred and heated for 5 hours longer after which the organic layer was separated and the aqueous layer was extracted with ether. The ether extract was combined with the organic material, all of which was dried over sodium sulfate after which the ether was removed. The product (250 parts) was distilled over a range of 45–190° C. at 1–2 mm. This material had an iodine value of 281 and a hydroxyl content of 0.94%. Two hundred twenty-five parts of this material was treated with 23 parts of metallic sodium at 105° C. with stirring over a period of 1½ hours. Stirring and heating at 105° C. was maintained for 4 hours longer. Thereupon the reaction mixture was cooled to 85° C. and 145 parts of allyl bromide was added slowly. The reaction mixture was then refluxed with stirring for 2 hours after which the excess sodium was destroyed with alcohol and the product (237 parts) was extracted with ether in the usual manner. This material was distilled through a 16-inch heated Vigreaux column to obtain a low boiling fraction of 80 parts of triallylglycerol (B. P. 150° C. at 2 mm., iodine number=365.0, density at 25° C.=0.9269, refractive index at 25° C.=1.4483). The second fraction of 90 parts was the tetraallyl ether of diglycerol (B. P.=191° C. at 2 mm., iodine number =308.4, density at 25° C.=0.9709, refractive index at 25° C.=1.4603). A third fraction of 25 parts was obtained which was the pentaallyl ether of triglycerol (B. P.=225° C. at 2 mm., iodine number=284.9, density at 25° C.=0.9926, refractive index at 25° C.=1.4660). There remained 15 parts of non-distillable residue.

While various modifications of the invention have been described, it is to be understood that the invention is not limited thereto, but may be varied within the scope of the following claims.

We claim as our invention:

1. Process for the production of a polyglycerol which comprises reacting glycerol with glycerol-monohalohydrin in the presence of concentrated aqueous alkali at an elevated temperature, thereafter diluting the reaction mixture with a low aliphatic alcohol, filtering to remove precipitated inorganic material, neutralizing the filtrate, concentrating the filtrate to a syrup and extracting the syrup with an anhydrous low aliphatic alcohol to recover the polyglycerol.

2. Process for the production of a polyglycerol which comprises reacting glycerol with glycerol monohalohydrin in the presence of concentrated aqueous alkali at an elevated temperature, thereafter neutralizing the reaction mixture and diluting the reaction mixture with a low aliphatic alcohol, filtering the reaction mixture to remove precipitated inorganic material, concentrating the filtrate to a sirup, and extracting the sirup with an anhydrous low aliphatic alcohol to recover the polyglycerol.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 2,161,937 | Scott | June 13, 1939 |
| 2,258,892 | Harris | Oct. 14, 1941 |
| 2,380,185 | Marple et al. | July 10, 1945 |
| 2,444,296 | Keim et al. | June 29, 1948 |